(12) United States Patent
Kakuda et al.

(10) Patent No.: US 10,530,183 B2
(45) Date of Patent: *Jan. 7, 2020

(54) COMMUNICATION APPARATUS, POWER MANAGEMENT APPARATUS, AND POWER MANAGEMENT METHOD

(71) Applicant: KYOCERA Corporation, Kyoto-shi, Kyoto (JP)

(72) Inventors: Yuji Kakuda, Yokohama (JP); Kazutaka Nakamura, Yokohama (JP); Yuri Sato, Kawasaki (JP); Yuki Suzuki, Yokohama (JP); Takashi Inoue, Zama (JP); Kentaro Kamei, Kyoto (JP)

(73) Assignee: KYOCERA Corporation, Kyoto (JP)

( * ) Notice: Subject to any disclaimer, the term of this patent is extended or adjusted under 35 U.S.C. 154(b) by 63 days.

This patent is subject to a terminal disclaimer.

(21) Appl. No.: 15/579,902

(22) PCT Filed: Jun. 8, 2016

(86) PCT No.: PCT/JP2016/067075
§ 371 (c)(1),
(2) Date: Dec. 5, 2017

(87) PCT Pub. No.: WO2016/199815
PCT Pub. Date: Dec. 15, 2016

(65) Prior Publication Data
US 2018/0175665 A1    Jun. 21, 2018

(30) Foreign Application Priority Data
Jun. 8, 2015  (JP) .................... 2015-115848

(51) Int. Cl.
*G05D 3/12*  (2006.01)
*G05D 5/00*  (2006.01)
(Continued)

(52) U.S. Cl.
CPC .......... *H02J 13/0017* (2013.01); *G05B 15/02* (2013.01); *G06Q 50/06* (2013.01);
(Continued)

(58) Field of Classification Search
CPC .... H02J 3/32; H02J 3/46; H04L 12/28; H04L 67/10; H04Q 9/00; G05B 15/02; G06Q 50/06
(Continued)

(56) References Cited

U.S. PATENT DOCUMENTS

2011/0140648 A1 * 6/2011 Lee .................. H02J 3/32
320/101
2013/0229059 A1   9/2013 Baba et al.
(Continued)

FOREIGN PATENT DOCUMENTS

JP   2002-152976 A   5/2002
JP   2013-31236 A    2/2013
(Continued)

OTHER PUBLICATIONS

International Search Report dated Aug. 9, 2016, issued by Japan Patent Office for International Application No. PCT/JP2016/067075.
(Continued)

*Primary Examiner* — Md Azad
(74) *Attorney, Agent, or Firm* — Procopio Cory Hargreaves and Savitch LLP

(57) ABSTRACT

A communication apparatus comprises a first communication unit configured to receive, from an external server, an output suppression message instructing output suppression of a dispersed power source; and a second communication unit configured to perform communication of a predetermined message having a predetermined format with a power management apparatus that manages power of an equipment (Continued)

installed in a consumer's facility. The output suppression of the dispersed power source is performed in accordance with the output suppression message by a conversion apparatus that converts DC power output from the dispersed power source to AC power. The predetermined format includes an information element capable of storing at least one of first information and second information, the first information being related to a communication status with the conversion apparatus, the second information being related to an acquisition status of the output suppression message. The second communication unit is configured to transmit, to the power management apparatus, the predetermined message including at least one of the first information and the second information as an information element.

9 Claims, 5 Drawing Sheets

(51) Int. Cl.
G05D 9/00 (2006.01)
G05D 11/00 (2006.01)
G05D 17/00 (2006.01)
H02J 13/00 (2006.01)
G06Q 50/06 (2012.01)
H02J 3/46 (2006.01)
H04L 12/28 (2006.01)
H04Q 9/00 (2006.01)
G05B 15/02 (2006.01)
H02J 3/32 (2006.01)
H02J 3/38 (2006.01)
H04L 29/08 (2006.01)

(52) U.S. Cl.
CPC .............. *H02J 3/32* (2013.01); *H02J 3/381* (2013.01); *H02J 3/46* (2013.01); *H02J 13/0006* (2013.01); *H04L 12/28* (2013.01); *H04Q 9/00* (2013.01); *H04L 67/10* (2013.01); *Y02E 40/72* (2013.01); *Y02E 60/722* (2013.01); *Y04S 10/12* (2013.01); *Y04S 10/14* (2013.01)

(58) Field of Classification Search
USPC ......................................................... 700/297
See application file for complete search history.

(56) References Cited

U.S. PATENT DOCUMENTS

| 2014/0100805 | A1* | 4/2014 | Takagi | G01R 19/2513 |
| | | | | 702/64 |
| 2014/0167979 | A1 | 6/2014 | Soma et al. | |
| 2014/0300187 | A1* | 10/2014 | Kojima | H02J 3/381 |
| | | | | 307/24 |
| 2015/0185292 | A1* | 7/2015 | Doi | H01M 10/488 |
| | | | | 340/870.02 |
| 2016/0156191 | A1* | 6/2016 | Takanaka | H02M 7/48 |
| | | | | 307/82 |
| 2017/0293579 | A1* | 10/2017 | Sako | H02J 7/00 |

FOREIGN PATENT DOCUMENTS

| JP | 2013-051833 A | 3/2013 |
| JP | 2013-161118 A | 8/2013 |
| JP | 2014-120918 A | 6/2014 |
| JP | 2014-171359 A | 9/2014 |
| WO | 2013/118266 A1 | 8/2013 |

OTHER PUBLICATIONS

Office Action dated Apr. 11, 2017, issued in counterpart Japanese Application No. 2016-569100.
Office Action dated Sep. 5, 2017, issued in counterpart Japanese Application No. 2016-569100.

* cited by examiner

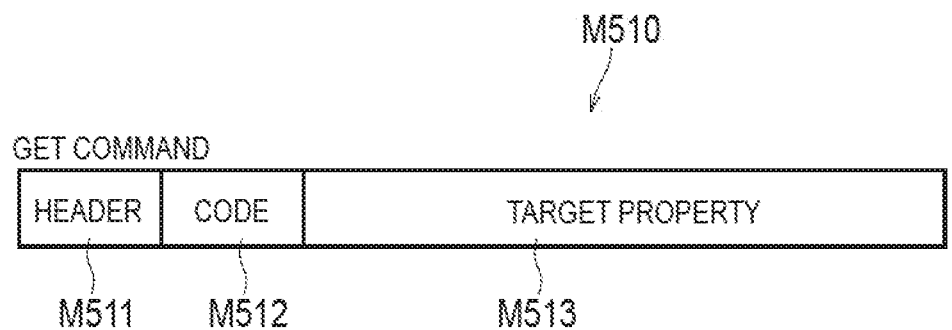
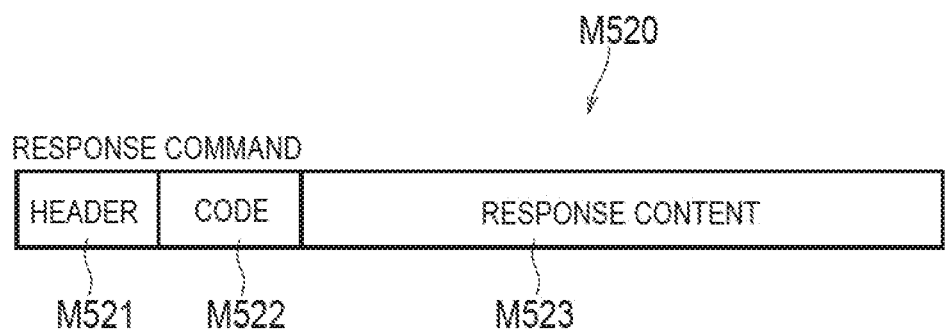
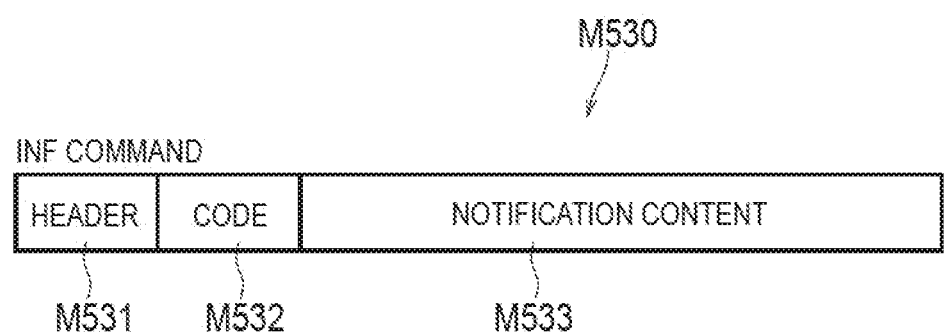

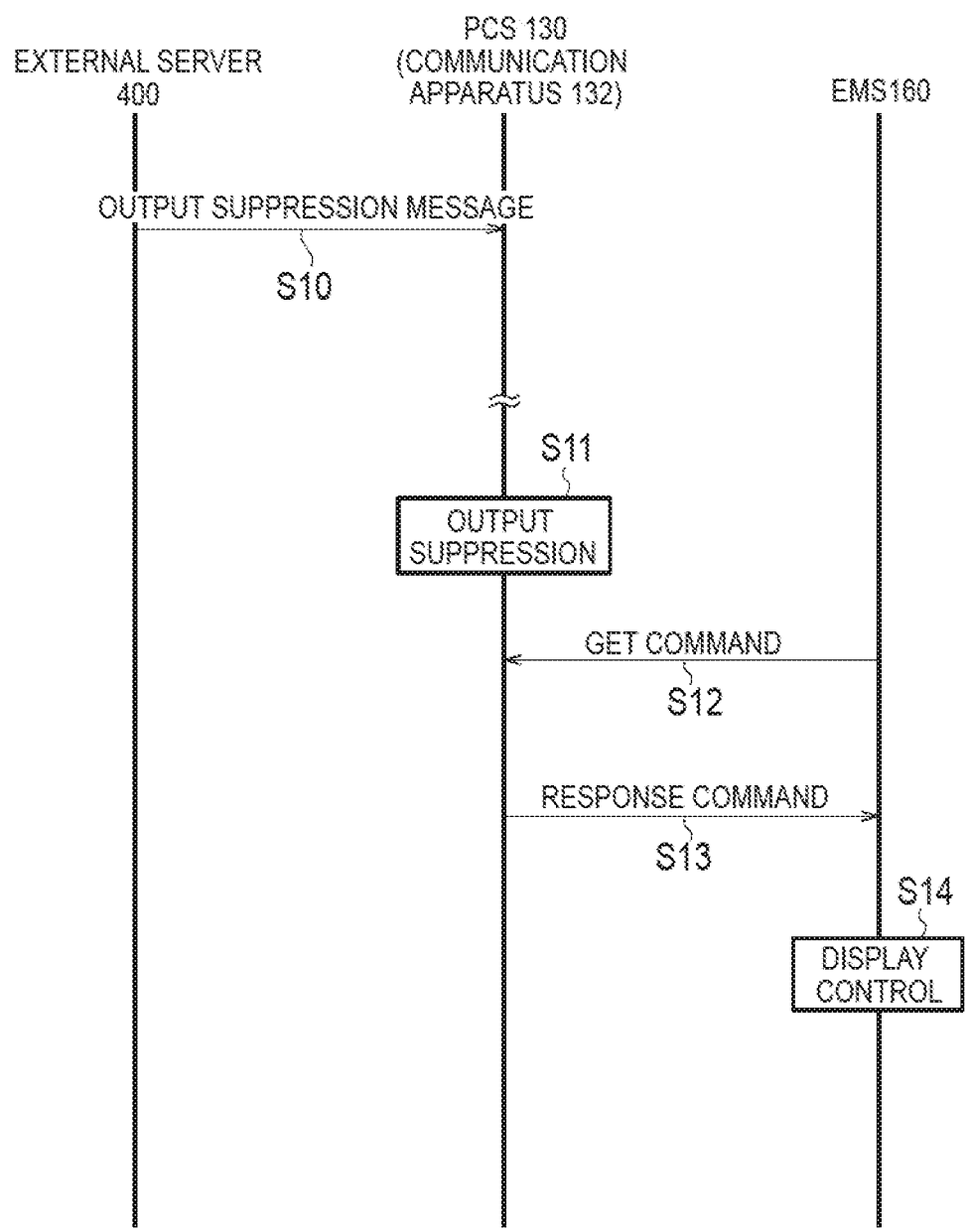

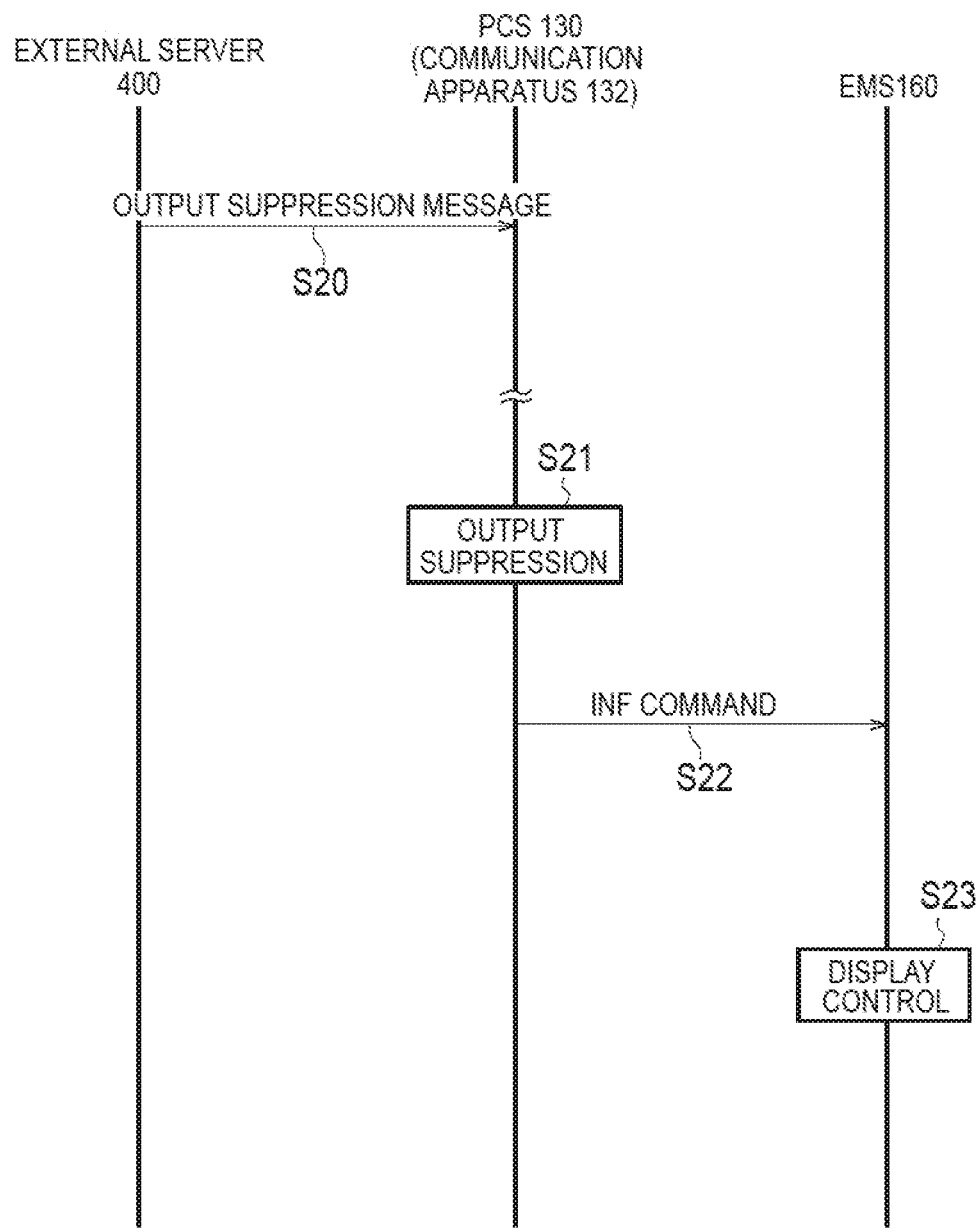

COMMUNICATION APPARATUS, POWER MANAGEMENT APPARATUS, AND POWER MANAGEMENT METHOD

TECHNICAL FIELD

The present disclosure relates to a communication apparatus that receives an output suppression message for instructing output suppression of a dispersed power source from an external server, a power management apparatus that receives a predetermined message from a power conversion apparatus, and a power management method of receiving an output suppression message for instructing output suppression of a dispersed power source from an external server.

BACKGROUND ART

A power conversion apparatus (a power conditioner) connected to a dispersed power source that outputs DC power is known. The power conversion apparatus includes a conversion apparatus that converts DC power input from dispersed power source to AC power (for example, Patent Literature 1).

Here, when the conversion apparatus does not have a communication function, the power conversion apparatus includes a communication apparatus connected to the conversion apparatus in addition to the conversion apparatus. For example, the communication apparatus receives a message for instructing output suppression of the dispersed power source (hereinafter referred to as an "output suppression message") from a server of a power transmission and distribution company such as a power company (hereinafter referred to as an "external server"), and the conversion apparatus suppress the output of the dispersed power source in accordance with the output suppression message received by the communication apparatus.

CITATION LIST

Patent Literature

Patent Literature 1: Japanese application publication No. 2014-171359

SUMMARY

A communication apparatus according to a first aspect comprises: a first communication unit configured to receive, from an external server, an output suppression message instructing output suppression of a dispersed power source; and a second communication unit configured to perform communication of a predetermined message having a predetermined format with a power management apparatus that manages power of an equipment installed in a consumer's facility. The output suppression of the dispersed power source is performed in accordance with the output suppression message by a conversion apparatus that converts DC power output from the dispersed power source to AC power. The predetermined format includes an information element capable of storing at least one of first information and second information, the first information being related to a communication status with the conversion apparatus, the second information being related to an acquisition status of the output suppression message. The second communication unit is configured to transmit, to the power management apparatus, the predetermined message including at least one of the first information and the second information as an information element.

A power management apparatus according to a second aspect comprises: a controller configured to control a display apparatus such that power information of a consumer's facility is displayed; and a communication unit configured to perform communication of a predetermined message having a predetermined format with a power conversion apparatus including a communication apparatus and a conversion apparatus, the communication apparatus receiving, from an external server, an output suppression message for instructing output suppression of a dispersed power source, the conversion apparatus converting DC power output from the dispersed power source into AC power. The predetermined format includes an information element capable of storing at least one of first information and second information, the first information being related to a communication status between the conversion apparatus and the communication apparatus, the second information being related to an acquisition status of the output suppression message. The communication unit receives, from the power conversion apparatus, the predetermined message including at least one of the first information and the second information as the information element. The controller performs display control for information related to the output suppression of the dispersed power source in accordance with the predetermined message including at least one of the first information and the second information as the information element.

A power management method according to a third aspect comprises: a step of receiving, by a communication apparatus, an output suppression message from an external server, the output suppression message instructing output suppression of a dispersed power source, the communication apparatus performing communication of a predetermined message having a predetermined format with a power management apparatus that manages power of an equipment installed in a consumer's facility; a step of performing, by a conversion apparatus, the output suppression of the dispersed power source in accordance with the output suppression message, the conversion apparatus converting DC power output from the dispersed power source to AC power; and a step of transmitting, by the communication apparatus, the predetermined message to the power management apparatus, the predetermined message including at least one of first information and second information as the information element included in the predetermined format, the first information being related to a communication status between the conversion apparatus and the communication apparatus, the second information being related to an acquisition status of the output suppression message.

BRIEF DESCRIPTION OF DRAWINGS

FIG. 4 is a diagram illustrating an example of a predetermined message according to an embodiment.

FIG. 5 is a diagram illustrating an example of a predetermined message according to an embodiment.

FIG. 6 is a diagram illustrating an example of a predetermined message according to an embodiment.

FIG. 7 is a sequence diagram illustrating a power management method according to an embodiment.

FIG. 8 is a sequence diagram illustrating a power management method according to an embodiment.

DESCRIPTION OF EMBODIMENTS

Figure 1:
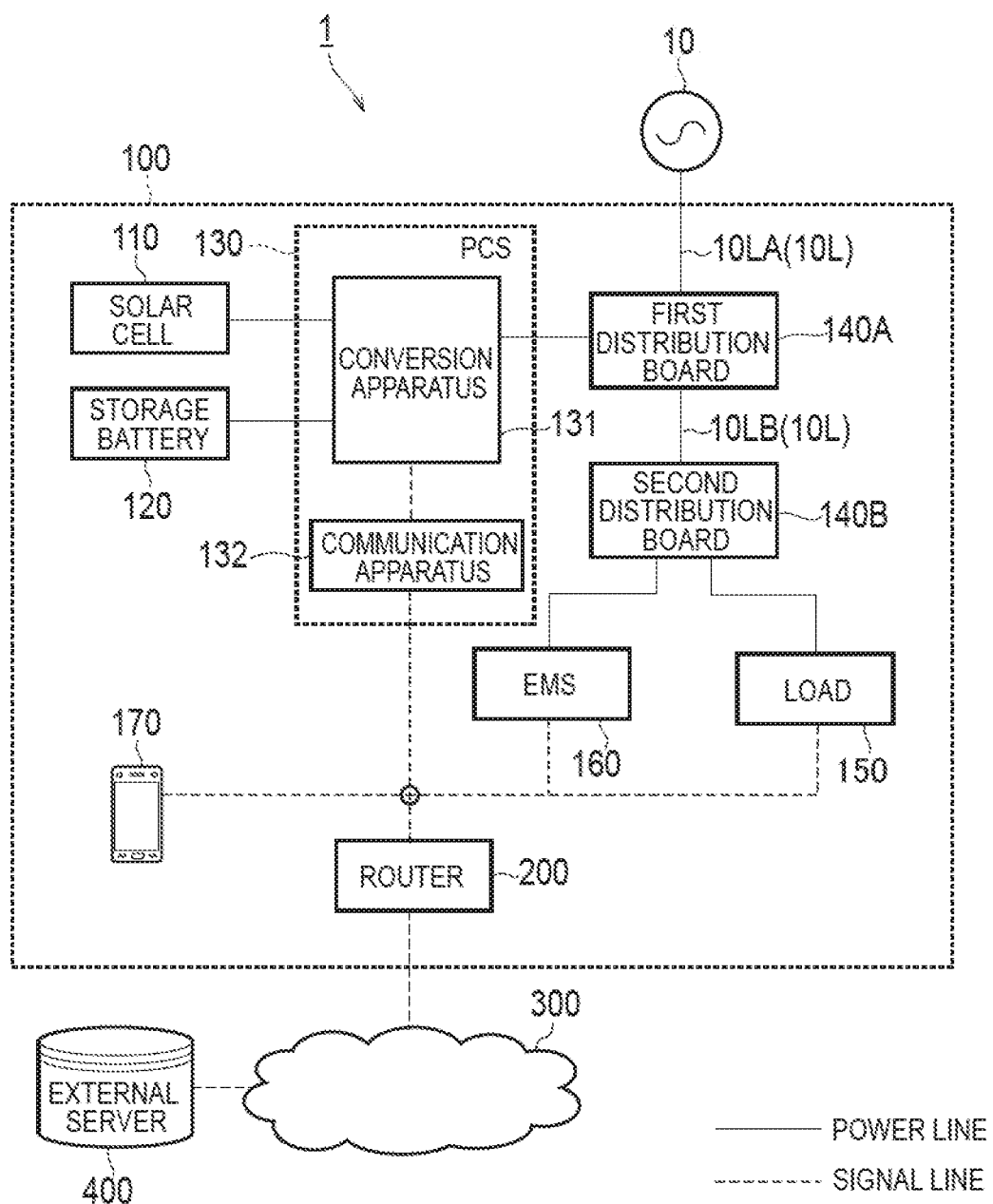
FIG. 1 is a diagram illustrating a power management system 1 according to an embodiment.

Hereinafter, the embodiment will be described with reference to the drawings. Note that the same or similar reference signs are applied to the same or similar portions in the following descriptions of the drawings.

It must be understood that the drawings are schematic, and the ratio of each dimension and the like may differ from the real one. Accordingly, specific dimensions and the like should be understood with reference to the following description. Furthermore, it must be understood that, the relationship or ratio of dimensions included in each of the drawings may differ.

Overview of Disclosure

In recent years, power management apparatus (EMS: Energy Management System) that manages power of equipment installed in a consumer's facility has attracted attention.

In such a circumstance, a procedure for transmitting an output suppression message from a communication apparatus included in the power conversion apparatus to the power management apparatus is not defined, and one of the challenges is how to let the power management apparatus to know whether or not a condition that stops the conversion apparatus is satisfied.

A communication apparatus according to the overview of disclosure comprises: a first communication unit configured to receive, from an external server, an output suppression message instructing output suppression of a dispersed power source; and a second communication unit configured to perform communication of a predetermined message having a predetermined format with a power management apparatus that manages power of an equipment installed in a consumer's facility. The output suppression of the dispersed power source is performed in accordance with the output suppression message by a conversion apparatus that converts DC power output from the dispersed power source to AC power. The predetermined format includes an information element capable of storing at least one of first information and second information, the first information being related to a communication status with the conversion apparatus, the second information being related to an acquisition status of the output suppression message. The second communication unit is configured to transmit, to the power management apparatus, the predetermined message including at least one of the first information and the second information as an information element.

In the overview of the disclosure, the second communication unit transmits the predetermined message including at least one of the communication status information and the acquisition status information as the information element to the power management apparatus. Therefore, the power management apparatus can know whether or not a condition that stops the conversion apparatus is satisfied.

Here, in order to guarantee the control according to the above-described output suppression message, as a condition that stops the conversion apparatus, for example, usage scenes where occurrence of disconnection of communication between the conversion apparatus and the communication apparatus, occurrence of a condition that the communication apparatus has not obtained the necessary output suppression message and the like has been defined are assumed.

Embodiment (Power Management System)

A power management system according to an embodiment will be described below.

As illustrated in FIG. 1, the power management system 1 includes a consumer's facility 100 and an external server 400. The consumer's facility 100 includes a router 200. The router 200 is connected to the external server 400 via a network 300. The router 200 constitutes a local area network and is connected to each equipment (for example, a communication apparatus 132 of a PCS 130, a load 150, an EMS 160, and a display apparatus 170). In FIG. 1, a solid line indicates a power line, and a dotted line indicates a signal line. The present disclosure is not limited to this example, and a signal may be transmitted via power line.

The consumer's facility 100 includes a solar cell 110, a storage battery 120, the PCS 130, the distribution board 140, the load 150, the EMS 160, and the display apparatus 170.

The solar cell 110 is an apparatus that generates power in response to light reception. The solar cell 110 outputs the generated DC power. A power generation amount of the solar cell 110 varies depending on an amount of solar radiation radiated to the solar cell 110. The solar cell 110 is an example of a dispersed power source that operates in accordance with a message (output suppression message) for instructing output suppression of the dispersed power source.

Here, the output suppression of the dispersed power source refers to reducing the amount of power that reversely flows to a grid out of the power generated by the dispersed power source. The reducing of the amount of power that reversely flows includes setting the amount of power that reversely flows to zero. By reducing the amount of power that reversely flows, for example, it is possible to stabilize the grid. Further, the output suppression of the dispersed power source includes reducing the output (power generation or discharging) of the dispersed power source regardless of the reverse power flow. Thus, for example, it is possible to contribute to an increase in a power purchase amount in the consumer's facility or to reduce a gas purchase amount when the dispersed power source is a fuel cell.

The storage battery 120 is an apparatus that accumulates power. The storage battery 120 outputs the accumulated DC power. The storage battery 120 may operate in accordance with the output suppression message, but in an embodiment, an example in which the storage battery 120 need not operate in accordance with the output suppression message is described.

The PCS 130 is an example of a power conversion apparatus (a power conditioning system (PCS)) that converts DC power to AC power. In an embodiment, the PCS 130 includes a conversion apparatus 131 and a communication apparatus 132.

The conversion apparatus 131 converts the DC power input from the solar cell 110 to the AC power and converts the DC power input from the storage battery 120 into the AC power. Further, the conversion apparatus 131 converts the AC power supplied from a power grid 10 into the DC power. The conversion apparatus 131 is connected to a main power line 10L (here, a main power line 10LA and a main power line 10LB) connected to the power grid 10 via a first distribution board 140A and also connected to both the solar cell 110 and the storage battery 120. The main power line 10LA is a power line connecting the power grid 10 with the first distribution board 140A, and the main power line 10LB is a power line connecting the first distribution board 140A with a second distribution board 140B.

The communication apparatus 132 is connected to the conversion apparatus 131, receives various kinds of messages to be transmitted to the conversion apparatus 131, and transmits various kinds of messages supplied from the conversion apparatus 131. In communication between the communication apparatus 132 and the conversion apparatus 131, a protocol (for example, its own protocol) applied to the PCS 130 is used.

In an embodiment, the communication apparatus 132 is connected to the external server 400 via the router 200 and receives the output suppression message for instructing the output suppression of the dispersed power source from the router 200. The communication apparatus 131 and the external server 400 may communicate via a dedicated line or may communicate via a public communication line such as the Internet.

The communication apparatus 132 is connected to the EMS 160 via the router 200, and performs communication of a predetermined message having a predetermined format with the EMS 160. The predetermined format is not particularly limited, and for example, an ECHONET Lite scheme, an SEP 2.0 scheme, a KNX scheme, or the like can be used.

For example, the predetermined format is a format conforming to the ECHONET Lite scheme. In this case, the predetermined message may be a command that can include at least one of first information (hereafter, communication status information) related to a communication status between the conversion apparatus 131 and the communication apparatus 132 and second information (hereafter, acquisition status information) related to an acquisition status of the output suppression message. Specifically, examples of the predetermined message include an SET command, a GET command, a response command to a GET command, and an INF command.

The SET command is a message for instructing a setting or an operation for the PCS 130. The GET command is a message for acquiring a status of the PCS 130. The response command is a message including information requested by the GET command. The INF command is a message for notifying of the status of the PCS 130. In an embodiment, the GET command is an example of a transmission request message for requesting transmission of a message from the PCS 130 to the EMS 160.

The distribution board 140 is connected to the main power line 10L. The distribution board 140 includes the first distribution board 140A and the second distribution board 140B. The first distribution board 140A is connected to the power grid 10 via the main power line 10LA and connected to the solar cell 110 and the storage battery 120 via the conversion apparatus 131. Further, the first distribution board 140A controls the power supplied from the conversion apparatus 131 and the power supplied from the power grid 10 such that the power flows to the main power line 10LB. The power flowing from the main power line 10LB is distributed to each equipment (here, the load 150 and the EMS 160) through the second distribution board 140B.

The load 150 is an apparatus that consumes the power supplied via the power line. For example, the load 150 includes an apparatus such as a refrigerator, a lighting, an air conditioner, a television, or the like. The load 150 may be a single apparatus or a plurality of apparatuses.

The EMS 160 is an apparatus (an energy management system (EMS)) that manages the power information indicating the power in the consumer's facility 100. The power in the consumer's facility 100 refers to power flowing in the consumer's facility 100, power purchased by the consumer's facility 100, power sold from the consumer's facility 100, or the like.

The EMS 160 may control a power generation amount of the solar cell 110, the charging amount of the storage battery 120 and a discharging amount of the storage battery 120. The EMS 160 may be configured integrally with the distribution board 140 or the PCS 130. The EMS 160 is an apparatus connected to the network 300, and the function of the EMS 160 may be provided through a cloud service via the network 300.

In an embodiment, the EMS 160 is connected to each equipment (for example, the communication apparatus 132 of the PCS 130 and the load 150) via the router 200, and performs communication of a predetermined message having a predetermined format with each equipment.

The EMS 160 is connected to the display apparatus 170 via the router 200 and communicates with the display apparatus 170. The EMS 160 may perform communication of a predetermined message having a predetermined format with the display apparatus 170. As described above, the predetermined format is, for example, a format conforming to the ECHONET Lite scheme.

The display apparatus 170 displays the power information indicating the power in the consumer's facility 100. Examples of the display apparatus 170 include a smartphone, a tablet, a digital television, and a dedicated terminal. The display apparatus 170 is connected to the EMS 160 in a wired or radio manner and communicates with the EMS 160. The display apparatus 170 may perform communication of a predetermined message having a predetermined format with the EMS 160. The display apparatus 170 receives data necessary for displaying the power information from the EMS 160.

The communication apparatus 132 is connected to the external server 400 via the network 300 through the router 200. The communication apparatus 132 is connected with the router 200 in a wired or radio manner, and the router 200 is connected with the communication apparatus 132 in a wired or radio manner.

The network 300 is a communication network connecting the EMS 160 with the external server 400. The network 300 may be the Internet. The network 300 may include a mobile communication network. Further, the network 300 may be a dedicated communication line or a general communication line. For example, when the output of the solar cell 110 is a predetermined output or more, the output suppression can be executed more reliably using a dedicated communication line as the network 300.

The external server 400 transmits the output suppression message indicating the output suppression of the dispersed power source. The external server 400 may transmit a message (a demand response (DR)) for instructing suppression of the power flow from the power grid 10.

The output suppression message includes a target output suppression level indicating a level of the output suppression of the dispersed power source (here, the solar cell 110). The target output suppression level is decided in accordance with an output certified as an output capability (for example, a rated output) of the PCS that controls the dispersed power source (hereinafter referred to as an "equipment certified output"). The target output suppression level may be indicated by an absolute value (for example, ○○ kW) decided in accordance with the equipment certified output, may be indicated by a relative value (for example, a decrease of ◯◯ kW) with respect to the equipment certified output, or may be indicated by a suppression proportion (for example, ◯◯%) with respect to the equipment certified output. Further, the target output suppression level has been described using the equipment certified output but may be an equipment certified capacity [kWh].

When the output capability of the dispersed power source is different from the output capability of the PCS, a smaller one of the output capabilities is the equipment certified output. In a case in which a plurality of PCSs are installed, the equipment certified output is a sum of output capabilities of a plurality of PCSs.

In an embodiment, the output suppression message includes calendar information indicating a schedule of the output suppression of the dispersed power source. In the calendar information, the schedule of the output suppression of the dispersed power source may be set in units of 30 minutes. The calendar information may include a schedule of one day, a schedule of one month, or a schedule of one year.

In an embodiment, a predetermined period may be decided as a maximum period in which the output suppression of the dispersed power source is performed. For example, a predetermined time may be the number of days per year (a number-of-days rule) or may be a cumulative time per year (a cumulative time rule). More specifically, for example, the predetermined period may be 30 days per year (a 30 day rule) or may be 360 hours per year (a 360 hour rule). However, the predetermined period may not be decided (a designation rule). These rules are types of the output suppression of the dispersed power source according to the output suppression message.

(Communication Apparatus)

Figure 2:
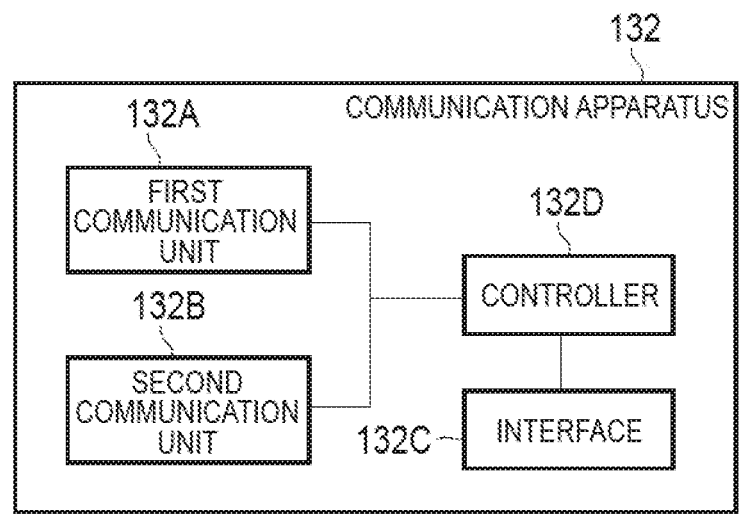
FIG. 2 is a diagram illustrating a communication apparatus 132 according to an embodiment.

The communication apparatus according to an embodiment will be described below. The communication apparatus 132 includes a first communication unit 132A, a second communication unit 132B, an interface 132C, and a controller 132D as illustrated in FIG. 2.

The first communication unit 132A receives the output suppression message for instructing the output suppression of dispersed power source from the external server 400. In an embodiment, the first communication unit 132A may receive the output suppression message from the external server 400 without going through the EMS 160.

The second communication unit 132B performs communication of a predetermined message having a predetermined format with the EMS 160. As described above, the predetermined format is, for example, a format conforming to the ECHONET Lite scheme. Here, the predetermined format used for communication between the communication apparatus 132 (the second communication unit 132B) and the EMS 160 may be different from a format used for communication between the communication apparatus 132 (the first communication unit 132A) and the external server 400. The predetermined format used for the communication between the second communication unit 132B (the second communication unit 132B) and the EMS 160 may be different from a format used for communication between the communication apparatus 132 (the interface 132C) and the conversion apparatus 131.

The second communication unit 132B may periodically transmit a predetermined message to the EMS 160. Specifically, the periodic transmission may be transmission at predetermined intervals such as 30 minutes, one hour, or one day. The present disclosure is not limited thereto, and the second communication unit 132B may transmit a predetermined message having a predetermined format when connected to a network, when activated, when reactivated, or when at least one of communication status information and acquisition status information to be described later is changed.

In an embodiment, the predetermined format includes an information element capable of storing at least one of the communication status information related to a communication status between the conversion apparatus 131 and the communication apparatus 132 and acquisition status information related to an acquisition status of the output suppression message. The second communication unit 132B transmits a predetermined message including at least one of the communication status information and the acquisition status information as an information element to the EMS 160. The second communication unit 132B may transmit a predetermined message including both the communication status information and the acquisition status information as an information element to the EMS 160.

Here, when the predetermined format is a format conforming to the ECHONET Lite scheme, the second communication unit 132B receives a transmission request message (the GET command) for requesting the EMS 160 to transmit a message as a predetermined message from the EMS 160. In this case, the second communication unit 132B may transmit a predetermined message (the INF command) including at least one of the communication status information and the acquisition status information as an information element to the EMS 160 without depending on the transmission request message (the GET command). Alternatively, the second communication unit 132B may transmit a predetermined message (the response command) including at least one of the communication status information and the acquisition status information as an information element to the EMS 160 in accordance with the transmission request message (the GET command).

In an embodiment, the communication status information includes at least one information piece among a plurality of information pieces (1A) and (1B) to be described below. Since the communication status information includes two or more information pieces, the EMS 160 can know the status of the PCS 130 in more detail.

(1A) The communication status information includes information indicating whether or not the communication between the conversion apparatus 131 and the communication apparatus 132 is disconnected. For example, in a case in which the communication between the conversion apparatus 131 and the communication apparatus 132 is wired communication, when a response signal to a transmission signal is not received from the conversion apparatus 131 within a certain period after the transmission signal (for example, a polling signal) is transmitted from the communication apparatus 132 to the conversion apparatus 131, the disconnection of the communication between the conversion apparatus 131 and the communication apparatus 132 is detected.

On the other hand, in a case in which the communication between the conversion apparatus 131 and the communication apparatus 132 is radio communication, the disconnection of the communication between the conversion apparatus 131 and the communication apparatus 132 is detected when the quality of the communication satisfies a disconnection condition. For example, the quality of the communication is one or more parameters selected from a link quality indicator (LQI), a received signal strength indicator (RSSI), a signal to interference ratio (SIR), and a signal to interference and noise ratio (SINR). In a case in which the radio communication is unable to be actually performed regardless of the quality of the communication, it may be determined that the communication is disconnected.

(1B) The communication status information includes information indicating the quality of the communication between the conversion apparatus 131 and the communication apparatus 132 when the communication between the conversion apparatus 131 and the communication apparatus 132 is radio communication. As described above, the quality of communication is one or more parameters selected from the LQI, the RSSI, the SIR, and the SINR. In this case, when the quality of the communication does not satisfy a predetermined condition, the communication status information may include information indicating that there is a possibility of stopping the conversion apparatus 131. The predetermined condition may be a condition more relaxed than the above-described disconnection condition.

In an embodiment, the acquisition status information includes at least one information piece among a plurality of information pieces (2A) to (2C) to be described below. Since the acquisition status information includes two or more information pieces, the EMS 160 can detect the status of the PCS 130 in further detail.

(2A) The acquisition status information includes information indicating that the conversion apparatus 131 is scheduled to be stopped when a schedule of the future (for example, a next day) is not included in the calendar information included in the output suppression message. The schedule of the future (for example, the next day) may be a schedule indicating that the output suppression of the dispersed power source is scheduled to be performed or may be a schedule indicating that the output suppression of the dispersed power source is scheduled not to be performed. The information indicating that the conversion apparatus 131 is scheduled to be stopped is information indicating that there is a plan to stop the conversion apparatus 131 in the future (for example, the next day). Further, when the schedule of the future for performing the output suppression is a date or time, the information indicating that the conversion apparatus 131 is scheduled to be stopped may be information indicating that a schedule for stopping the conversion apparatus 131 is performed at a predetermined time.

(2B) The acquisition status information includes the information indicating that the conversion apparatus 131 is scheduled to be stopped when the output suppression message is not acquired at a timing after an update timing of the calendar information. The update timing of the calendar information may be a timing before a final timing at which the information indicating whether there is a schedule for performing the output suppression in the calendar information is set. For example, when the information indicating whether there is a schedule in the calendar information is set before Jun. 5, 2015, Jun. 5, 2015 is the final timing (date).

In this case, the update timing of the calendar information is a timing (date) before Jun. 5, 2015. Alternatively, when the information indicating whether there is schedule in the calendar information is set before 12:00 AM on Jun. 5, 2015, 12:00 AM on Jun. 5, 2015 is the final timing (a date and time). In this case, the update timing of the calendar information is the timing (date and time) before 12:00 on Jun. 5, 2015. The information indicating that the conversion apparatus 131 is scheduled to be stopped is information indicating that there is a plan to stop the conversion apparatus 131 at the final timing or the update timing.

(2C) The acquisition status information may include information related to at least one of the pervious update timing and the next update timing. The update timing may be a date or may be a time (hour, minute, second, or the like). Both of the pervious update timing and the next update timing may be included.

The interface 132C is an interface with the conversion apparatus 131. The interface 132C may be a wired interface or a radio interface. In the communication between the communication apparatus 132 and the conversion apparatus 131, a protocol (for example, its own protocol) applied to the PCS 130 is used.

The controller 132D includes a memory and a CPU and controls the communication apparatus 132. For example, the controller 132D controls the output of the dispersed power source in accordance with the output suppression message by controlling the conversion apparatus 131 using the interface 132C. The controller 132D acquires the state of the conversion apparatus 131 (for example, the power generation amount of the solar cell 110, the storage amount of the storage battery 120, and the discharging amount of the storage battery 120) from the conversion apparatus 131 uses the interface 132C. The controller 132D generates a command for controlling the conversion apparatus 131 on the basis of a predetermined message received from the EMS 160 and outputs the generated command to the conversion apparatus 131 using the interface 132C.

(Power Management Apparatus)

Figure 3:
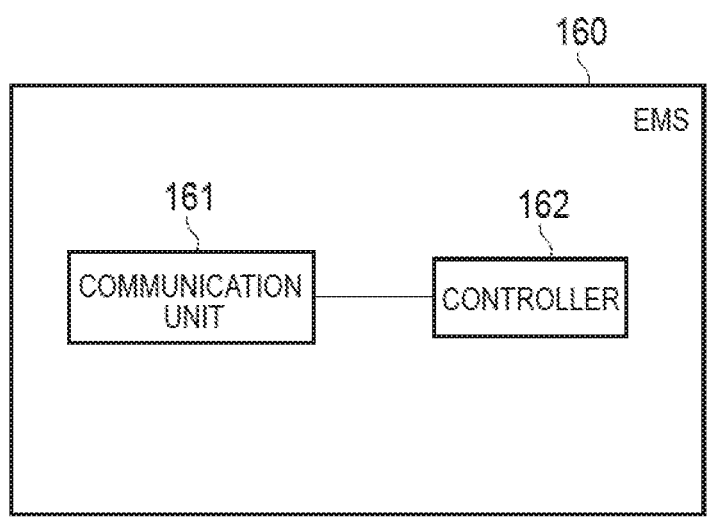
FIG. 3 is a diagram illustrating an EMS 160 according to an embodiment.

The power management apparatus according to an embodiment will be described below. The EMS 160 includes a communication unit 161 and a controller 162 as illustrated in FIG. 3.

The communication unit 161 performs communication of a predetermined message having a predetermined format with the communication apparatus 132. As described above, the predetermined format is, for example, a format conforming to the ECHONET Lite scheme.

The controller 162 includes a memory and a CPU and controls the EMS 160. The controller 162 may control the power generation amount of the solar cell 110, the charging amount of the storage battery 120, and the discharging amount of the storage battery 120.

In an embodiment, the controller 162 controls the display apparatus 170 such that the power information indicating the power in the consumer's facility 100 is displayed. The controller 162 performs display control for information related to the output suppression of the dispersed power source in accordance with the predetermined message including at least one of the communication status information and the acquisition status information as an information element. The controller 162 performs at least one of a plurality of display controls to be described below.

(1A) In a case in which the communication status information includes the information indicating whether or not the communication between the conversion apparatus 131 and the communication apparatus 132 is disconnected, the controller 162 displays information indicating whether or the conversion apparatus 131 is normally operating. For example, when the communication between the conversion apparatus 131 and the communication apparatus 132 is disconnected, the controller 162 performs control such that the information indicating that the conversion apparatus 131 is stopped is displayed. In this case, the controller 162 may perform control such that information indicating a reason for stopping the conversion apparatus 131 (for example, disconnection of communication) is displayed.

(1B) In a case in which the communication status information includes information indicating the quality of the communication between the conversion apparatus 131 and the communication apparatus 132, the controller 162 may perform control such that the information indicating the quality of communication is displayed. In this case, the controller 162 may perform control such that the information indicating that there is a possibility that the conversion apparatus 131 will be stopped is displayed.

Alternatively, the communication status information may include the information indicating that there is a possibility that the conversion apparatus 131 will be stopped. Even in this case, the controller 162 performs control such that the information indicating that there is a possibility that the conversion apparatus 131 will be stopped is displayed.

(2A) In a case in which the schedule of the future (for example, the next day) is not included in the calendar information included in the output suppression message, and the acquisition status information includes the information indicating that the conversion apparatus 131 is scheduled to be stopped, the controller 162 performs control such that the information indicating that the conversion apparatus 131 is scheduled to be stopped is displayed. In this case, the controller 162 may perform control such that the information indicating the timing (for example, the next day) at which the conversion apparatus 131 is stopped is displayed. The controller 162 may perform control such that the information indicating the reason for stopping the conversion apparatus 131 (that the schedule of the next day is not included in the calendar information) is displayed.

(2B) In a case in which the acquisition suppression message is not acquired at a timing after the update timing of the calendar information, and the acquisition status information includes the information indicating that the conversion apparatus 131 is scheduled to be stopped, the controller 162 performs control the information indicating the conversion apparatus 131 is scheduled to be stopped is displayed. In this case, the controller 162 may perform control such that the information indicating the timing of stopping the conversion apparatus 131 (that is, the final timing or the update timing). The controller 162 may perform control such that the information indicating the reason for stopping the conversion apparatus 131 (that the output suppression message is not acquired at the timing after the update timing) is displayed.

(Message Format)

A message format according to an embodiment will be described below. Here, the predetermined format is assumed to be a format conforming to the ECHONET Lite scheme.

A GET command M510 includes a header M511, a code M512, and a target property M513 as illustrated in FIG. 4. In an embodiment, the GET command M510 is an example of the transmission request message for requesting the EMS 160 to transmit a message and is an example of a message transmitted from the EMS 160 to the communication apparatus 132.

The header M511 is information indicating the destination or the like of the GET command M510. The code M512 is information indicating a type of message including the code M512. Here, the code M512 is information indicating that the message including the code M512 is the GET command. The target property M513 is information indicating target content that the EMS 160 desires to know. The target property M513 is an information element capable of storing information for requesting transmission of at least one of the communication status information and the acquisition status information.

A response command M520 includes a header M521, a code M522, and a response content M523 as illustrated in FIG. 5. In an embodiment, the response command is an example of the predetermined message including at least one of the communication status information and the acquisition status information as the information element and is transmitted from the communication apparatus 132 to the EMS 160 in accordance with the transmission request message (the GET command).

The header M521 is information indicating the destination or the like of the response command M520. The code M522 is information indicating a type of message including the code M522. Here, the code M522 is information indicating that the message including the code M522 is the response command. The response content M523 is information indicating content requested by the GET command. The response content M523 is an information element capable of storing at least one of the communication status information and the acquisition status information.

The INF command M530 includes a header M531, a code M532, and a notification content M533 as illustrated in FIG. 6. In an embodiment, the INF command is an example of the predetermined message including at least one of the communication status information and the acquisition status information as the information element and is transmitted from the communication apparatus 132 to the EMS 160 without depending on the transmission request message (the GET command).

The header M531 is information indicating the destination or the like of the INF command M530. The code M532 is information indicating a type of message including the code M532. Here, the code M532 is information indicating that the message including the code M532 is the INF command. The notification content M533 is information indicating content to be reported to the EMS 160. The notification content M533 is an information element capable of storing the at least one of the communication status information and the acquisition status information.

(Power Management Method)

A power management method according to an embodiment will be described below. Here, the predetermined format used for the communication between the communication apparatus 132 and the EMS 160 is assumed to be a format conforming to the ECHONET Lite scheme.

Firstly, the description will proceed with an example in which the predetermined message including at least one of the communication status information and the acquisition status information as the information element is the response command transmitted in accordance with the GET command will be described.

As illustrated in FIG. 7, in step S10, the communication apparatus 132 receives the output suppression message from the external server 400 without going through the EMS 160.

In step S11, the communication apparatus 132 performs the output suppression of the dispersed power source in accordance with the output suppression message.

In step S12, the EMS 160 transmits the GET command to the communication apparatus 132. The EMS 160 may periodically transmit the GET command to the communication apparatus 132. The GET command includes the information for requesting the transmission of at least one of the communication status information and the acquisition status information as the information element.

In step S13, the communication apparatus 132 transmits the response command to the EMS 160 in accordance with the GET command. The response command is a predetermined message including at least one of the communication status information and the acquisition status information as the information element.

In step S14, the EMS 160 performs display control for the information related to the output suppression of the dispersed power source in accordance with the response command.

Secondly, the description will proceed with an example in which the predetermined message including at least one of the communication status information and the acquisition status information as the information element is the response command transmitted without depending on the GET command.

As illustrated in FIG. 8, in step S20, the communication apparatus 132 receives the output suppression message from the external server 400 without going through the EMS 160.

In step S21, the communication apparatus 132 performs the output suppression of the dispersed power source in accordance with the output suppression message.

In step S22, the communication apparatus 132 transmits the INF command to the EMS 160 without depending on the GET command. The communication apparatus 132 may periodically transmit the INF command in the period in which the output suppression of the dispersed power source is performed. The INF command is the predetermined message including at least one of the communication status information and the acquisition status information as the information element.

Here, when a condition for transmitting the communication status information is satisfied, the communication apparatus 132 may transmit the INF command including the communication status information as an information element. The condition for transmitting the communication status information is a condition that the disconnection of the communication between the conversion apparatus 131 and the communication apparatus 132 is detected or a condition that the quality of the communication between the conversion apparatus 131 and the communication apparatus 132 does not satisfy a predetermined condition.

Similarly, the communication apparatus 132 may transmit the INF command including the acquisition status information as an information element when the condition for transmitting the acquisition status information is satisfied. The condition for transmitting the acquisition status information may be a condition that the schedule of the future (for example, the next day) is not included in the calendar information included in the output suppression message or a condition that the output suppression message is not acquired at a timing after the update timing of the calendar information.

In step S23, the EMS 160 performs display control for the information related to the output suppression of the dispersed power source in accordance with the INF command.

(Operations and Effects)

In an embodiment, the communication apparatus 132 transmits the predetermined message including at least one of the communication status information and the acquisition status information as the information element to the EMS 160. Therefore, the EMS 160 can know whether or not a condition that stops the conversion apparatus is satisfied.

Other Embodiments

Although the present disclosure has been described with reference to the above-described embodiments, the description and the drawings constituting a part of this disclosure should not be interpreted to limit the present disclosure. Various alternative embodiments, examples, and operational techniques will be apparent to those skilled in the art from this disclosure.

In the embodiment, the solar cell 110 has been described as an example of the dispersed power source operating in accordance with the output suppression message. However, the dispersed power source is not limited to this example. The dispersed power source may be an apparatus that generates power using natural energy such as wind power or geothermal power. Alternatively, the dispersed power source may be a fuel cell that generates electrical power using fuel gas.

In the embodiment, the example in which the predetermined format used for the communication between the communication apparatus 132 and the EMS 160 is a format conforming to the ECHONET Lite scheme has been described. However, the embodiment is not limited to this example. The predetermined format may be a format standardized as a format used in the consumer's facility 100.

In the embodiment, the PCS 130 (multi-PCS) for controlling the output of the solar cell 110 and the output of the storage battery 120 has been described. However, the embodiment is not limited to this example. The PCS 130 may be an equipment that controls only the output of at least one of the solar cell 110, the storage battery 120, and the fuel cell.

In an embodiment, since the PCS 130 is a multi-PCS, when control of charging the power generated by the solar cell 110 in the storage battery 120 is performed while performing the output suppression, the information element to be transmitted to the EMS 160 includes information indicating whether or not the solar cell 110 charges the power which is to undergo the output suppression in the storage battery 120. Specifically, the information element to be transmitted to the EMS 160 includes information indicating that the solar cell 110 charges the power which is to undergo the output suppression in the storage battery 120, information indicating that the solar cell 110 is scheduled to charge the power which is to undergo the output suppression in the storage battery 120, information indicating that the solar cell 110 does not charge the power which is to undergo the output suppression in the storage battery 120, information indicating that the solar cell 110 is not scheduled to charge the power which is to undergo the output suppression in the storage battery 120, and information indicating that the solar cell 110 is scheduled to stop charging the power which is to undergo the output suppression in the storage battery 120. Further, when at least one of the communication status information and the acquisition status information is transmitted from the communication apparatus 132 (the second communication unit 132B) to the EMS 160, information on the storage capacity of the storage battery 120 may be transmitted together. The information related to the storage capacity includes, for example, a current storage capacity, a storable capacity, or the like.

Further, when a predetermined message including at least one of the communication status information and the acquisition status information as the information element is transmitted to the EMS 160, the second communication unit 132B may transmit authentication information of the PCS 130 together. As the authentication information, information identifying an individual of the PCS 130 (for example, an ID), a specific password, or the like may be used. When the authentication information is transmitted together, security can be improved.

In the embodiment, the first communication unit 132A and the second communication unit 132B are separate members, but the first communication unit 132A and the second communication unit 132B may be integrated. In other words, the first communication unit 132A may double as the second communication unit 132B.

When a predetermined message including at least one of the communication status information and the acquisition status information as the information element is transmitted to the EMS 160, in a case in which the conversion apparatus 131 is stopped, the second communication unit 132B may transmit the information indicating that the conversion apparatus 131 is stopped together. In other words, in a case in which the communication is disconnected or the quality of the radio is lower than a predetermined condition, the conversion apparatus 131 may be urgently stopped in view of safety, and in this case, the communication status information and the stop information of the conversion apparatus 131 are transmitted to the EMS 160. Similarly, for example, in a case in which the calendar information is not updated after the next update timing, the conversion apparatus 131 may be urgently stopped in view of safety, and in that case, the acquisition status information and the stop information of the conversion apparatus 131 are transmitted to the EMS 160.

In an embodiment, the acquisition status information may include information indicating that the conversion apparatus 131 is scheduled to operate when the calendar information is updated. Specifically, when the output suppression message is not acquired at the timing after the update timing of the calendar information, the information indicating that the conversion apparatus 131 is scheduled to be stopped transmitted as the acquisition status information, but thereafter, when the calendar information is updated, and it is before the next update timing, information related to an operation schedule or an operation start of the conversion apparatus 131 may be included.

The output suppression of the dispersed power source is performed by the PCS 130. Therefore, the output suppression of the dispersed power source can be considered as the output suppression of the PCS 130.

This application claims the benefit of Japanese Priority Patent Application JP 2015-115848 filed Jun. 8, 2015, the entire contents of which are incorporated herein by reference.

The invention claimed is:

1. A communication apparatus, comprising:
a first communication unit configured to receive, from an external server, an output suppression message instructing output suppression of a dispersed power source, wherein the output suppression of the dispersed power source is performed in accordance with the output suppression message by a conversion apparatus that converts DC power output from the dispersed power source to AC power;
a controller configured to generate an information element indicating an acquisition status of the output suppression message; and
a second communication unit configured to perform communication of a predetermined message having a predetermined format with a power management apparatus that manages power of an equipment installed in a consumer's facility, wherein the second communication unit is configured to transmit, to the power management apparatus, the predetermined message including the information element indicating the acquisition status of the output suppression message.

2. The communication apparatus according to claim 1, wherein the controller is further configured to generate an information element indicating a communication status between the communication apparatus and the conversion apparatus; and
the second communication unit is configured to transmit, to the power management apparatus, the predetermined message further including the information element indicating the communication status between the communication apparatus and the conversion apparatus.

3. The communication apparatus according to claim 2, wherein the information element indicating the communication status includes information indicating a quality of communication between the communication apparatus and the conversion apparatus.

4. The communication apparatus according to claim 3, wherein the information element indicating the communication status includes information indicating that there is a possibility that the conversion apparatus will be stopped when the quality of the communication does not satisfy a predetermined condition.

5. The communication apparatus according claim 1, wherein the output suppression message includes calendar information indicating a schedule of the output suppression of the dispersed power source, and
the information element indicating the acquisition status of the output suppression message includes information indicating that the conversion apparatus is scheduled to be stopped when a schedule of a future is not included in the calendar information.

6. The communication apparatus according to claim 1, wherein the output suppression message includes calendar information indicating a schedule of the output suppression of the dispersed power source, and
the information element indicating the acquisition status of the output suppression message includes information indicating that the conversion apparatus is scheduled to be stopped when the output suppression message is not acquired at a timing after an update timing of the calendar information.

7. The communication apparatus according to claim 1, wherein the predetermined format is different from a format used for communication with the conversion apparatus.

8. A power management apparatus, comprising:
a controller configured to control a display apparatus such that power information of a consumer's facility is displayed; and
a communication unit configured to perform communication of a predetermined message having a predetermined format with a power conversion apparatus including a communication apparatus and a conversion apparatus, the communication apparatus receiving, from an external server, an output suppression message for instructing output suppression of a dispersed power source, the conversion apparatus converting DC power output from the dispersed power source into AC power,
wherein the communication unit receives, from the power conversion apparatus, the predetermined message including an information element indicating an acquisition status of the output suppression message in the communication apparatus, and
the controller performs display control for information related to the output suppression of the dispersed power source in accordance with the predetermined message including the information element.

9. A power management method, comprising:
- a step of receiving, by a communication apparatus, an output suppression message from an external server, the output suppression message instructing output suppression of a dispersed power source, the communication apparatus performing communication of a predetermined message having a predetermined format with a power management apparatus that manages power of an equipment installed in a consumer's facility;
- a step of performing, by a conversion apparatus, the output suppression of the dispersed power source in accordance with the output suppression message, the conversion apparatus converting DC power output from the dispersed power source to AC power; and
- a step of transmitting, from the communication apparatus to the power management apparatus, the predetermined message including an information element indicating an acquisition status of the output suppression message in the communication apparatus.

* * * * *